United States Patent
Brehm et al.

(10) Patent No.: US 8,325,744 B2
(45) Date of Patent: Dec. 4, 2012

(54) HOSTED IPTV SYSTEM INCORPORATING A GATEWAY ADAPTER FOR PROCESSING IN A SHARED IPTV ENVIRONMENT

(75) Inventors: Michael J. Brehm, Allen, TX (US);
Corey F. Adams, Frisco, TX (US);
Brian C. Westmoreland, Plano, TX (US)

(73) Assignee: Alcatel Lucent, Paris (FR)

( * ) Notice: Subject to any disclaimer, the term of this patent is extended or adjusted under 35 U.S.C. 154(b) by 379 days.

(21) Appl. No.: 12/627,571

(22) Filed: Nov. 30, 2009

(65) Prior Publication Data

US 2011/0128965 A1   Jun. 2, 2011

(51) Int. Cl.
*H04L 12/28* (2006.01)

(52) U.S. Cl. ............ 370/401; 725/109; 726/27

(58) Field of Classification Search .......... None
See application file for complete search history.

(56) References Cited

U.S. PATENT DOCUMENTS

| | | | | |
|---|---|---|---|---|
| 7,865,593 B2* | 1/2011 | Yang et al. | ............ | 709/224 |
| 8,079,042 B2* | 12/2011 | Foti et al. | ............ | 725/14 |
| 2007/0028258 A1* | 2/2007 | Wollmershauser et al. | .... | 725/29 |
| 2007/0250884 A1* | 10/2007 | Qiu et al. | ............ | 725/106 |
| 2008/0310408 A1* | 12/2008 | Thompson et al. | ............ | 370/386 |
| 2008/0316960 A1* | 12/2008 | Daigle | ............ | 370/329 |
| 2010/0107204 A1* | 4/2010 | Foti et al. | ............ | 725/109 |
| 2010/0186065 A1* | 7/2010 | Chung et al. | ............ | 726/1 |
| 2010/0254370 A1* | 10/2010 | Jana et al. | ............ | 370/352 |
| 2010/0312892 A1* | 12/2010 | Woundy et al. | ............ | 709/226 |
| 2010/0333127 A1* | 12/2010 | Scott et al. | ............ | 725/24 |
| 2011/0093900 A1* | 4/2011 | Patel et al. | ............ | 725/54 |

* cited by examiner

*Primary Examiner* — Michael J Moore, Jr.
(74) *Attorney, Agent, or Firm* — S. R. Santema (57) ABSTRACT

A shared (or "hosted") IPTV system including intermediate IPTV facilities controlled by a host operator and accessible to one or more hosted operators pursuant to a shared service arrangement includes a gateway adapter for intercepting and manipulating operator transactions with the intermediate IPTV facilities. The gateway adapter is operable to modify operator calls directed to the intermediate IPTV facilities to include indicia of data uniquely available to the operator initiating the calls, the data having been logically partitioned into respective subscriber groups; and to forward the adapted calls to the intermediate IPTV facilities to invoke the operator transactions. Advantageously, execution of the adapted call provides the sourcing operator access to account information of its corresponding subscriber group while restricting access to account information of other subscriber groups.

9 Claims, 4 Drawing Sheets

HOSTED IPTV SYSTEM INCORPORATING A GATEWAY ADAPTER FOR PROCESSING IN A SHARED IPTV ENVIRONMENT

FIELD OF THE INVENTION

This invention relates to the field of IPTV (Internet Protocol Television).

BACKGROUND OF THE INVENTION

IPTV is a television delivery platform that relies on a packet-based network infrastructure, e.g., including broadband Internet access networks, to deliver television content to customers, typically as an alternative to traditional over-the-air broadcast, satellite and cable modalities. A typical IPTV solution will include five major areas: (1) head-end video acquisition equipment for receiving television content; (2) intermediate IPTV facilities (comprising, for example, Microsoft® Mediaroom™) including server platforms and associated IPTV middleware; (3) IP networking devices (e.g., routers, switches and Firewalls) for content distribution between various IPTV nodes; (4) Access nodes comprising, for example, VDSL or xPON equipment to enable high-bandwidth transport to and from the customer premises; and (5) operator-controlled applications which manage the IPTV solution or provide end-user IPTV applications.

As can be appreciated, the cost of entry into the IPTV market can be substantial. As an example, representative startup costs include (on top of the costs of implementing the network and access portions), securing contracts with video content providers, and building and maintaining head-end and intermediate IPTV facilities. Not surprisingly, particularly for smaller operators, the cost of entry can be prohibitively high.

To address this problem, a shared (or "hosted") IPTV solution has been contemplated, whereby in return for annual service payments or the like, a "master" or "hosting" operator with a deployed IPTV solution shares a portion of its IPTV infrastructure with one or more neighboring (or "hosted") operators. In one example, the shared IPTV infrastructure might include shared head-end facilities and a shared intermediate IPTV facility including Microsoft® Mediaroom™ server platforms and associated middleware. Thus, the hosted IPTV solution could advantageously enable hosted operators to enter the IPTV market with relatively low entry costs, while allowing the hosting operator to offset the enormous cost of the IPTV deployment with recurring service payments from the hosted operators.

However, to implement such a hosted IPTV solution, there is a need to maintain account information associated with potentially multiple operators, each having multiple subscribers, at the shared intermediate facility; and to support operator interactions with exposed application programming interfaces (APIs) of the shared intermediate facility in a manner that maintains operator and subscriber privacy. The present invention is directed to addressing this need.

SUMMARY OF THE INVENTION

This need is addressed and a technical advance is achieved in the art by a hosted IPTV system incorporating a gateway adapter that logically resides between one or more hosted operator facilities and the APIs of the shared intermediate facility. The gateway adapter will intercept and manipulate operator interactions with the APIs in a manner that is transparent to the respective operators and yet ensures privacy of account information between different operators.

In one embodiment, there is provided a method for use in a shared IPTV system including intermediate IPTV facilities controlled by a host operator and accessible to one or more hosted operators pursuant to a shared service arrangement, the intermediate IPTV facilities maintaining account information associated with a plurality of operators including the host operator and one or more hosted operators. The method comprises logically partitioning the account information associated with each of the plurality of operators into a corresponding plurality of subscriber groups; and, utilizing a gateway adapter to intercept and manipulate operator transactions, providing operator access to account information of its corresponding subscriber group while restricting access to account information of other subscriber groups.

In another embodiment, there is provided a method for use in a shared IPTV system including intermediate IPTV facilities controlled by a host operator and accessible to one or more hosted operators pursuant to a shared service arrangement, the intermediate IPTV facilities including one or more application programming interfaces (APIs) defining interfaces and protocols for operator transactions with the intermediate IPTV facilities. The method comprises utilizing a gateway adapter to intercept at least one operator call attempting to invoke an operator transaction directed to the APIs; adapt the call to include indicia of data uniquely available to the operator initiating the calls, yielding an adapted call, the adapted call having a format consistent with the requirements of an API to invoke the operator transaction; and forwarding the adapted call to the API to invoke the operator transaction, wherein execution of the adapted call provides access to the data uniquely available to the operator initiating the call while restricting access to data of other operators.

In still another embodiment, there is provided a gateway adapter for use in a shared IPTV system including intermediate IPTV facilities controlled by a host operator and accessible to one or more hosted operators pursuant to a shared service arrangement, the intermediate IPTV facilities maintaining account information associated with a plurality of operators including the host operator and one or more hosted operators, the account information logically partitioned into a corresponding plurality of subscriber groups associated with the plurality of operators.

The gateway adapter includes means for receiving an operator call intended to invoke an operator transaction with the intermediate IPTV facilities, the operator call including indicia of a sourcing operator, and wherein execution of the operator call nominally provides access to account information associated with the plurality of operators. The gateway adapter further includes means for identifying a subscriber group corresponding to the sourcing operator; and means for modifying the operator call to include indicia of the subscriber group of the sourcing operator, yielding an adapted call. Still further, the gateway adapter includes means for forwarding the adapted call to the intermediate IPTV facilities to invoke the operator transaction as a proxy for the operator call, wherein execution of the adapted call provides the sourcing operator access to account information of its corresponding subscriber group while restricting access to account information of other subscriber groups.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

Figure 1:
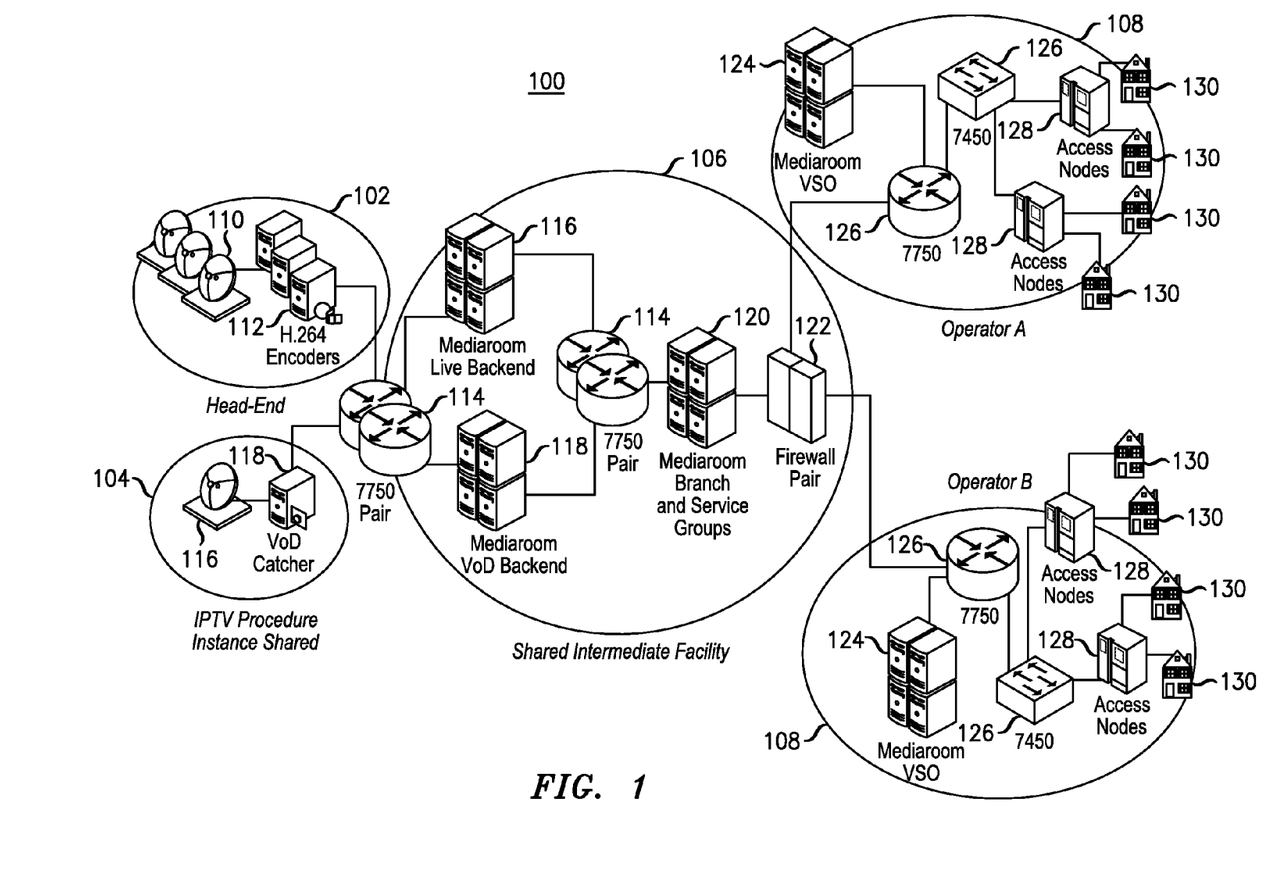
FIG. 1 is a block diagram of a hosted IPTV system according to embodiments of the present invention.

FIG. 1 illustrates an exemplary high level architecture of a hosted IPTV system 100 according to principles of the present invention. In one embodiment, the hosted IPTV system 100 comprises host-controlled head-end facilities 102, 104 and intermediate IPTV facility 106 (including Microsoft® Mediaroom™ resources) defining shared resources of the hosted IPTV system; and a plurality of operator-controlled facilities 108 characterizing individual operator resources of the IPTV system (as shown, controlled respectively by "Operator A" and "Operator B"). For purposes of example, Operator A is considered the "master" or "hosting" operator with primary ownership of the head-end facilities 102, 104 and intermediate IPTV facility 106, whereas Operator B comprises a neighboring (or "hosted") operator receiving IPTV content and services from the head-end facilities 102, 104 and intermediate IPTV facility 106 in return for recurring service payments or the like.

In one embodiment, the head-end facilities 102, 104 comprise national and video on demand (VoD) facilities for receiving national and video on demand (VoD) content, respectively. National head-end facility 102 receives national content from satellite receivers 110 and routes the content into H.264 encoders 112, which encodes the national content into a format acceptable to Microsoft® Mediaroom™ specifications. VoD facility 104 receives VoD content from satellite receivers 116 and catches the content at VoD catcher 118 waiting for asset ingestion into Mediaroom™. The national and VoD content is delivered unencrypted from facilities 102, 104 to host-controlled intermediate IPTV facility 106 by routers 114 (as shown, Alcatel Lucent 7750 routers) using multicast IP technology.

The host-controlled intermediate IPTV facility 106 includes respective Mediaroom™ Live Backend and Mediaroom™ VoD Backend server platforms 116, 118 for receiving and performing initial processing of the national and VoD content; Mediaroom™ Branch platforms 120, for providing IPTV services such as Digital Rights Management protection, client authentication, billing, subscriber management and application enablement, and for differentiating between accounts and devices of each operator; routers 114 (as shown, Alcatel Lucent 7750 routers) for providing content distribution and messaging between the platforms 116, 118 and 120; and a firewall 122 for blocking unauthorized access to the intermediate IPTV facility 106.

The Live Backend platform 116 is responsible for ingesting, encrypting and streaming live TV service (i.e., national content) to the subscribers of all operators. In one embodiment, the national live TV service defines a shared resource that is accessible to both hosting Operator A and hosted Operator B. Thus, there are no operator-specific values present in the creation of the national live TV services. While there is potential to resell content in a tiered structure, this capability can be enabled by functionality in the Mediaroom™ Branch platform 120 (rights/grants, channel maps, etc.).

In one embodiment, the Live Backend platform 116 is subject to the following constraints:

1) The Live Backend 116 must be built geographically close to the national head-end facilities 102, preferably in the same location. This geographic proximity constraint is derived from Mediaroom™ specifications for H.264 Encoder-to-AServer network requirements including: <10 ms round-trip time (RTT), <4 ms packet jitter and $10^{-10}$ bit-error rate (BER).

2) The Live Backend must be aware of all geographic region codes (GRCs) for all operators utilizing the hosted Mediaroom™ deployment. Blackouts must be triggered for the appropriate live TV events for each operator. This will add a requirement to build and operate an auxiliary system to trigger blackouts on the hosted Mediaroom™ solution.

3) The hosting operator will be required to work out licensing and resell agreements for the distribution of the national live TV content.

The VoD Backend platform 118 is responsible for ingesting, encrypting and staging VoD assets for the subscribers of all operators. Like the national live TV content, the VoD content comprises a shared resource that is accessible to both hosting Operator A and hosted Operator B. A tiered resell agreement can be realized by assigning the appropriate rights to an operator via the Mediaroom™ Branch 120 functionality. In one embodiment, the hosting operator will be required to work out licensing and resell agreements for the distribution of the VoD assets.

The Branch platform 120 maintains account information including, for example and without limitation, operator and/or subscriber data relating to subscriber management, billing and provisioning, programming schedules, channel line ups, pay-per-view and VoD ordering mechanisms, and the like. In one embodiment, the Branch platform 120 includes one or more application programming interfaces (API) for interfacing with the operators and controlling operator interactions with the Branch platform to access account information. For example and without limitation, the APIs may define interfaces and protocols for controlling operator OSS/BSS transactions (i.e., Operations Support System and/or Business Support System transactions) and access to account information relating to such transactions.

As will be appreciated, the Branch platform 120 is the most complex portion of the shared environment to manage. One of the challenges of the shared Mediaroom™ deployment is to make the IPTV services appear to be dedicated for a given operator, even though subscribers from various operators will be sharing the same server resources. In one embodiment, this is accomplished in part by logical groupings termed "subscriber groups" which are used to differentiate account information among potentially multiple operators each having multiple subscribers; and can designate membership for collections such as rights to a given channel package or even geographic location. Subscriber groups can span multiple "Service Groups," which define dedicated server resources for a given set of subscribers.

In one embodiment, operator-designation subscriber groups (specific to individual operators) are created to logically partition account information associated with each of potentially multiple operators dispersed across multiple Service groups, thereby avoiding the use of dedicated hardware for each operator. The use of subscriber groups creates the following advantages:

1) The Mediaroom™ deployment can be much more densely populated, increasing the revenue generation capabilities of the solution. Since each Service Group can host up to 180 k devices (at time of writing), designating a Service Group for an operator which has only 2000 devices translates to wasted server resources and, thus, lost revenue opportunities. Also, a Mediaroom Branch can host up to a maximum of 11 Service Groups (10 active, 1 spare), which would cap the number of operators per Branch at 10. Using subscriber groups, the 2000 devices in the example above need not be dedicated to a particular Service Group, but rather can be dispersed among the 10 active (shared) Service Groups and the Service Groups can be utilized up to their full capacity. Thus, in the present example, the Mediaroom™ Branch can serve up to 1.8M devices (180 k per Service Group×10 Service Groups). Moreover, because the Service Groups are shared among multiple operators, the number of operators per Branch is not constrained by the number of Service Groups, but rather becomes a factor of the number of operator provisioned devices versus the total device capacity of the Mediaroom™ Branch.

2) Catastrophic loss of a Service Group would potentially not result in a complete outage for any given operator. Since the accounts and devices for each operator are dispersed across the solution, such a failure would affect only the percentage of accounts and devices mapped to the failed Service Group. Other accounts and devices would be unaffected.

3) Adding a new operator is simply a provisioning task, assuming there is still capacity remaining in the Mediaroom™ deployment. There would not be a requirement to add more server and storage hardware until such time as the capacity of the Mediaroom™ deployment is exhausted.

4) Use of subscriber groups provides a straight-forward mechanism to distinguish each operator's accounts and devices in the system. Further, as will be described in greater detail in relation to FIG. 2, embodiments of the present invention include a privacy mechanism ("gateway adapter") that make the shared Mediaroom™ configuration transparent to the operators. Thus, the operators can use custom OSS/BSS tools for operations, built per Microsoft specifications and interfaces, without any extra tweaks or customizations required.

5) A tiered or a la carte resell agreement for national live and VoD content can be easily achieved using operator-designation subscriber groups. Rights to the content can be assigned on a subscriber group-basis, allowing access to authorized operators but blocking access to operators which choose not to carry that content.

In one embodiment, the operator facilities 108 each include a Video Serving Office (VSO) 124 for performing certain video services that are not well suited for the shared portion of the hosted IPTV system. For example and without limitation, the VSO can provide local live TV services, Emergency Alert Services (EAS), Instant Channel Change (ICC), Reliable-UDP (R-UDP) and VoD streaming. In one embodiment, the VSO 124 comprises a relatively small local head-end and Mediaroom™ Live Backend deployment (i.e., defining operator-controlled head-end and intermediate IPTV facilities that are small relative to the host-controlled head-end facilities 102, 104 and Mediaroom™ Live Backend facility 116) to accommodate local channels at the operator facilities 108. The local head-end (not shown) receives local TV content over the air and routes it to H.264 encoders (not shown). The VSO Live Backend (not shown) will ingest and encrypt this content, and then stream it to the subscribers for the operator.

As shown, the operator facilities further include routing elements 126 (as shown, Alcatel Lucent 7750 router and 7450 switch) for providing content distribution and messaging within the operator sites 108 and to and from the operator-controlled Intermediate IPTV facility 106; Access Nodes comprising, for example, VDSL or xPON equipment to enable high-bandwidth transport to and from the customer premises 130. The customer premises 130 include various client devices (e.g., set-top boxes, or STBs, not shown) for accessing IPTV content. In one embodiment, the operator sites further include IT Data Center Systems (not shown), operator-controlled applications which manage the IPTV solution or provide end-user IPTV applications.

As has been noted, the intermediate IPTV facilities of the IPTV system are distributed between host-controlled facilities 106 and the operator-controlled VSO 124. It has been further noted that by utilizing a full complement of service groups, the host-controlled intermediate IPTV facility 106 can serve up to 1.8M devices (180 k per Service Group×10 Service Groups) and multiple operators. As has further been noted, one of the challenges of the shared Mediaroom™ deployment is to make the IPTV services appear to be dedicated for any given operator, even though multiple operators, each serving multiple devices, will be sharing the same server resources. This translates to a requirement to allow operator interactions with the host-controlled Mediaroom Branch (including, without limitation, OSS/BSS interactions) using the exposed APIs to access account information without compromising operator or subscriber privacy/security.

Figure 2:
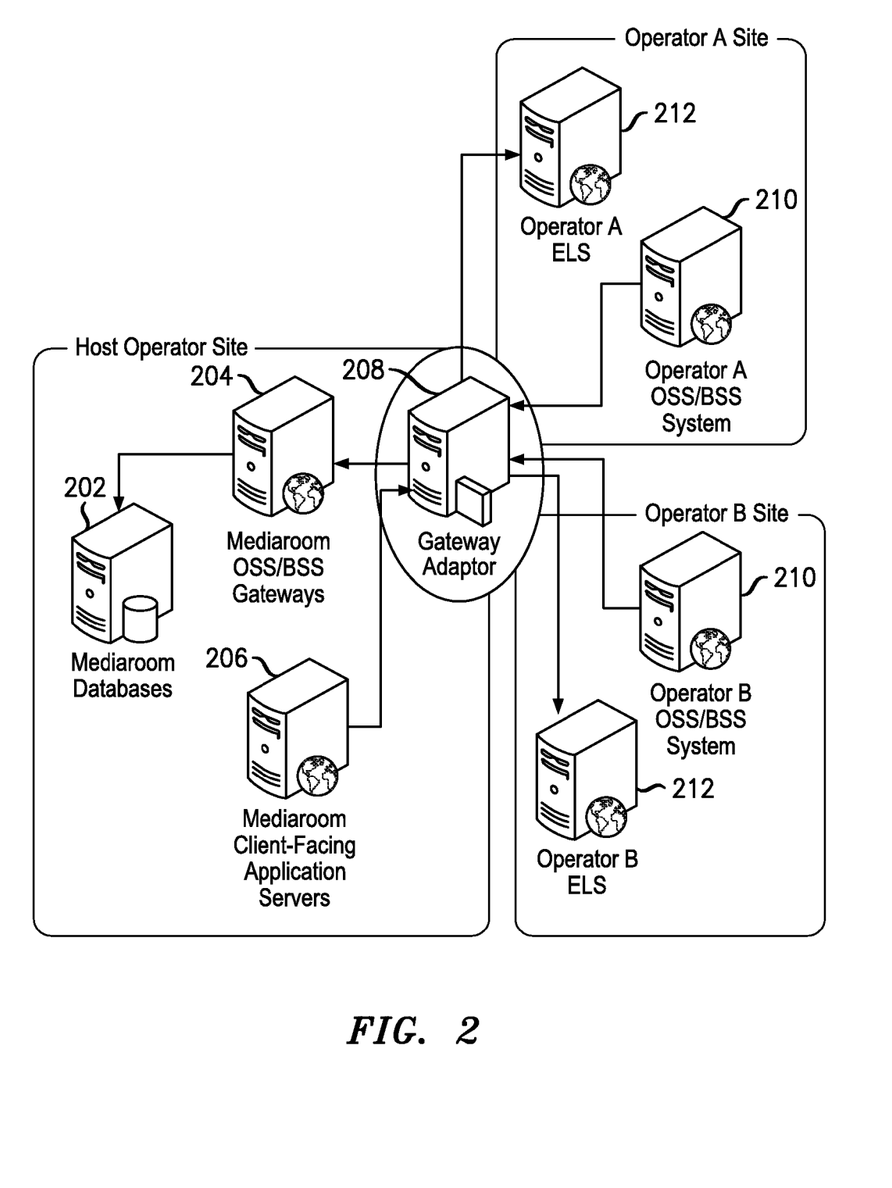
FIG. 2 is a block diagram of a communication subsystem of the hosted IPTV system including a gateway adapter for maintaining privacy of operator transactions, including OSS/BSS and ELS transactions, in the shared IPTV system.

FIG. 2 shows a communication subsystem 200 of the intermediate IPTV facilities of the hosted IPTV system, including components of the Mediaroom Video Serving Office (VSO) 124 and the Mediaroom Branch 120 that support OSS/BSS interactions between operator facilities 108 and host-controlled facilities 106 of the hosted IPTV system without compromising operator or subscriber privacy/security. As shown, the components include Mediaroom databases 202, OSS/BSS gateways 204, client-facing application servers 206 and gateway adapter 208, residing at the host operator site (in one embodiment, within the Mediaroom Branch 120); and operator-controlled OSS/BSS systems 210 and ELS servers 212 residing at the respective operator sites (in one embodiment, within the VSO 124 of the respective operator sites).

Each of these devices includes respective processors and memory (not shown) for effecting certain transactions relating to the services and capabilities of the IPTV system 100. As will be appreciated, the components of FIG. 2 are functional components that may be distributed among multiple individual components or devices. Further, although the components of FIG. 2 are identified and will be described with respect to OSS/BSS functionality, those skilled in the art will appreciate that the components of FIG. 2 may be utilized for virtually any instance of transactions with the host-controlled Mediaroom Branch including, but not limited to OSS/BSS transactions.

The operator OSS/BSS systems 210 are operator-implemented OSS/BSS platforms located in the operator facilities 108, unique for each operator, that are responsible, for example and without limitation, for provisioning workflow, account maintenance and billing. To execute these functions, operator OSS/BSS systems 210 initiate OSS/BSS web service calls with the host operator site 106. In one embodiment, the OSS/BSS web service calls are compliant with Microsoft Mediaroom OSS/BSS API specifications (i.e., the OSS/BSS systems 210 will perform Microsoft Mediaroom web service calls as if the Microsoft Mediaroom deployment was not shared). The OSS/BSS calls comprise web method calls encapsulated in SOAP over HTTP or HTTPS. The underlying network protocol is TCP/IP. The web method calls may be protected via SSL certificate (Secure Sockets Layer).

The operator ELS servers (External Login Servers) 212 are operator-implemented servers located in the operator facilities 108, unique for each operator, that provide additional custom authentication of STB clients.

The Mediaroom OSS/BSS gateways 204 are servers of the Mediaroom Branch that are responsible for exposing the OSS/BSS APIs and implementing the OSS/BSS API logic.

The gateway adapter 208 logically sits between the operators OSS/BSS systems 210 and the Mediaroom OSS/BSS gateways 204 and is the key component that enables operator interactions with the OSS/BSS APIs without compromising operator or subscriber privacy/security.

Figure 3:
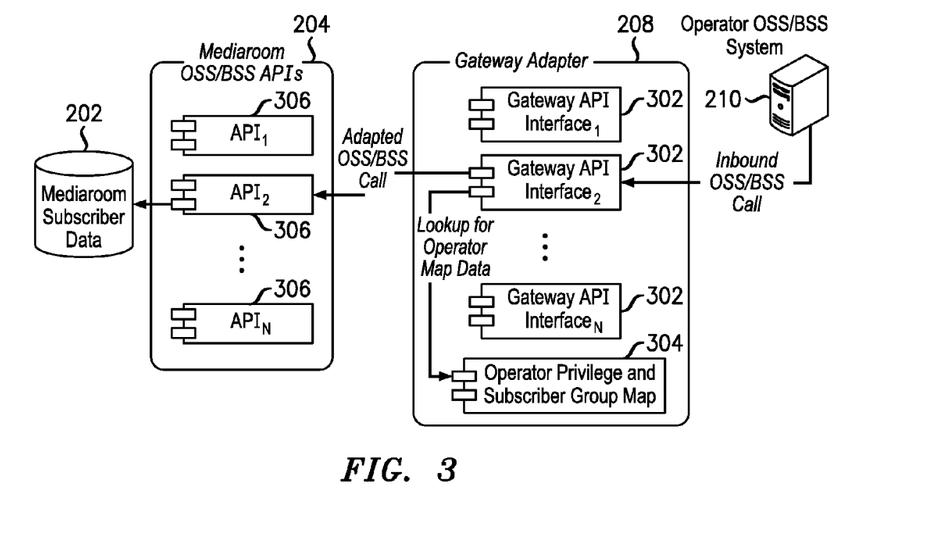
FIG. 3 is a block diagram illustrating components of the communication subsystem of FIG. 2 supporting an OSS/BSS transaction.

As best shown in FIG. 3, the gateway adapter performs the following functions relating to processing OSS/BSS transactions:

(1) Intercepts OSS/BSS web method calls from the operators' OSS/BSS systems 210. As shown, an inbound OSS/BSS web method call from operator OSS/BSS system 210, directed to the Mediaroom OSS/BSS gateway 204, is intercepted by a gateway API interface 302 ("Gateway API Interface 2").

(2) Performs a translation to an "operator-designation" subscriber group and operator privilege level via indicia of the sourcing operator, such as an SSL certificate mapping or source IP address of the incoming call. In one embodiment, this comprises the gateway API interface 302 determining, based on the IP address of the inbound OSS/BSS call, the particular operator (e.g., Operator A or Operator B) that sourced the call and determining, based on the identity of the sourcing operator, the appropriate operator-designation subscriber group and privilege level to be assigned to the call. This latter step is accomplished by querying or consulting an operator privilege and subscriber group mapping table 304 to find the operator-designation subscriber group and privilege level corresponding to the sourcing operator. This assumes the public IP addresses or the IP address range of each operator is known and is unique.

(3) Manipulates the OSS/BSS web method call based on the translated data (i.e., per the operator privilege level and the operator-designation subscriber group), yielding an adapted OSS/BSS web method call in which only data associated with the operator-designation subscriber group is accessible. For example, an inbound OSS/BSS call from Operator A to retrieve all billing records for July 1 will be converted to a call to retrieve all billing records for July 1 for accounts belonging to the operator-designation subscriber group corresponding to Operator A.

(4) Forwards the adapted OSS/BSS web method call to the Mediaroom APIs 306 (residing in Mediaroom OSS/BSS gateway 204) for processing, provided the operator privilege level is sufficient to execute the call. Processing of the call generally involves consulting subscriber data in the Mediaroom Databases 202 to perform an action, retrieve particular records, or the like. In one embodiment, certain OSS/BSS calls can be designated as requiring higher privileges to execute, and the gateway adapter would only allow calls from operator(s) having a sufficient privilege level to execute the call (most likely, the "master" or "host" operator will have the highest privilege level). For example and without limitation, OSS/BSS calls that can result in actions affecting multiple operators might be executable only by the "master" or "host" operator.

(5) Returns the resulting data, or error message, to the appropriate operator OSS/BSS system 210. In one embodiment, if the operator OSS/BSS system 210 does not have the appropriate privilege level to execute the requested OSS/BSS web method transaction, the gateway adapter 208 returns an HTTP 401 Unauthorized error to the Operator OSS/BSS system 210 and logs the unauthorized web method request.

Figure 4:
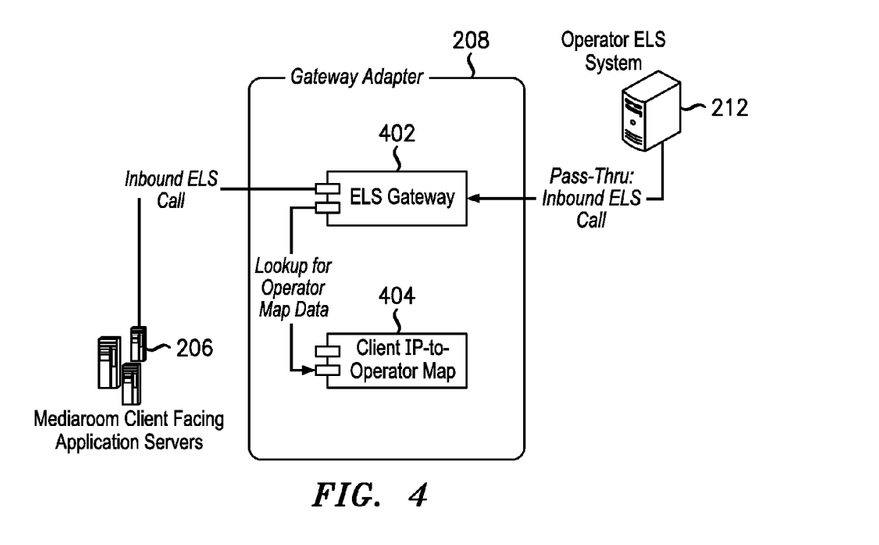
FIG. 4 is a block diagram illustrating components of the communication subsystem of FIG. 2 supporting an ELS transaction.

Referring to FIG. 4, the gateway adapter 208 can also allow for each operator to maintain a unique instance of External Login Server (ELS) 212 for providing operator-customized authentication logic during STB bootstrap by performing the following:

(1) Receives ELS Device Login calls from the Mediaroom client-facing application servers 206. As shown, an inbound ELS call from the client-facing application servers 206, directed to the Operator ELS system 212, is intercepted by ELS gateway 402. In one embodiment, the Device Login calls comprise web method calls encapsulated in SOAP over HTTP. The underlying network protocol is TCP/IP. The web method calls may be protected via SSL, per the operator security requirements.

(2) Performs a translation to a specific operator ELS based on the passed client IP address. In one embodiment, this comprises the ELS gateway 402 querying or consulting a client IP-to-operator mapping table 404 to determine the particular operator (e.g., Operator A or Operator B) and hence, the particular operator ELS system 212 associated with the IP address.

(3) Proxies the Device Login call to the operator ELS.

(4) Returns the login result (not shown) from the operator ELS to the Mediaroom client-facing application servers 206, thereby allowing authentication to complete.

In one embodiment, the gateway adapter 208 allows a user to define the following attributes for each operator: IP address range for STB clients belonging to the operator; IP address of the operator ELS; privilege level of the operator; operator name; operator-designation subscriber group; prefix string (to ensure uniqueness when creating objects within a shared Mediaroom environment); default routing response for an ELS Device Login web method request; use of SSL protection (Boolean); IP address or IP address range for operator OSS/BSS system (for Network/IIS ACLs); time-out value for OSS/BSS web method calls; and user accounts which can access the User Interface. The gateway adapter 208 also allows a user to define the following global attributes: log retention periods; name of the hosting operator (e.g., performed at install time).

Figure 5:
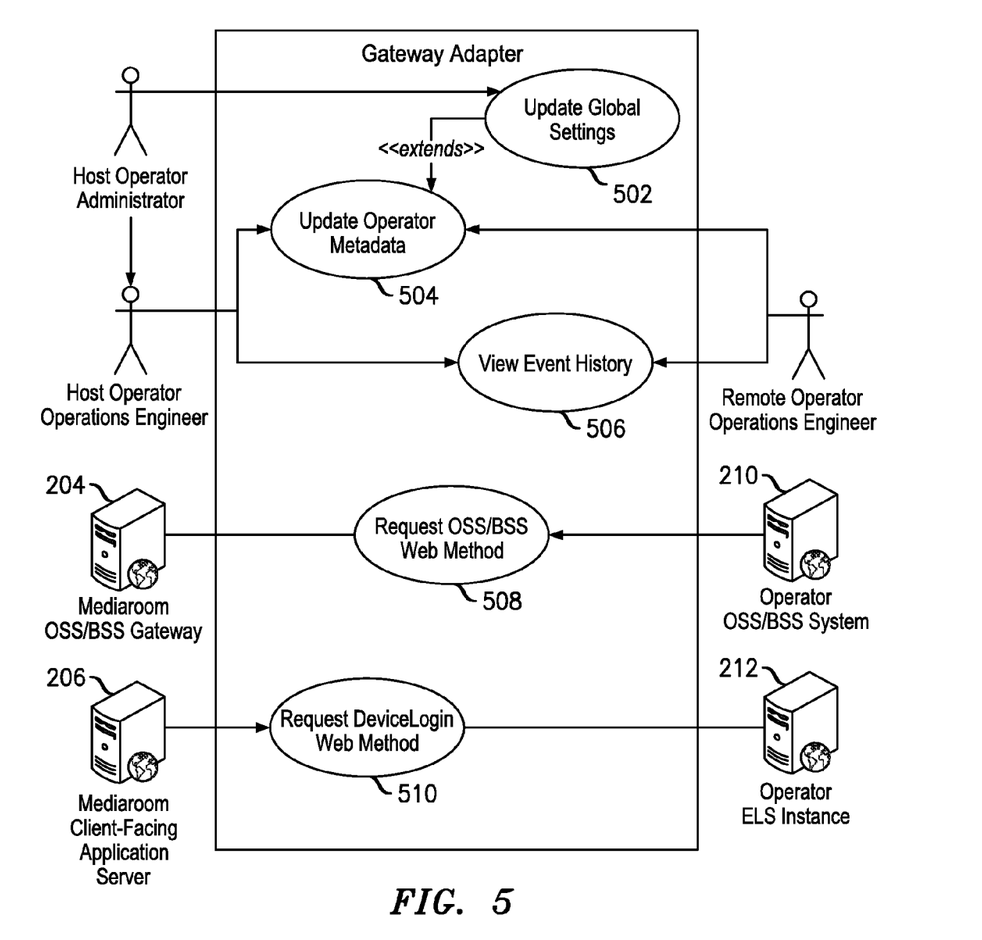
FIG. 5 is an activity sequence diagram illustrating various use cases of the gateway adapter of FIG. 2.

Now turning to FIG. 5, there is shown a generic illustration of various OSS/BSS transactions supported by the gateway adapter 208. These transactions include, without limitation, update global settings 502, update operator metadata 504, view event history 506, request OSS/BSS web method 508; and request DeviceLogin web method 510. The steps of FIG. 5 are implemented, where applicable, by human operators at the host site or operator sites, or using stored software routines within the Mediaroom OSS/BSS gateway 204, Mediaroom Client-facing application server 206, operator OSS/BSS system 210 or Operator ELS instance 212 of the hosted IPTV system.

The update global settings operation 502 is performed by an authenticated host operator administrator at the hosting site, to modify global settings in the gateway adapter 208 affecting any or all operators. The global settings that are subject to modification may include, for example and without limitation, any operator name, the IP address range for any operator OSS/BSS systems, the IP address range for STB clients belonging to any operator, the IP address range for any operator ELS instance, any operator-designation subgroup, any operator privilege level, any operator prefix string, the default routing response for DeviceLogin web method requests for any operator, the user accounts that can access the User Interface for any operator, OSS/BSS timeout values for any operator, the requirement for SSL use to protect HTTP traffic for any operator, privilege level of a given Mediaroom OSS/BSS web method, and the number of days worth of log files to retain for any operator.

The update operator metadata operation 504 is performed by an authenticated remote operator site operations engineer or host site operations engineer, where applicable, to create, update or delete metadata associated with a given operator. The operator metadata that is subject to modification may include, for example and without limitation, the IP address range for the operator OSS/BSS system(s), the IP address range for STB clients belonging to the operator, the IP address range for the operator ELS instance, the default routing response for DeviceLogin web method requests for the operator, the user accounts that can access the User Interface for the operator, OSS/BSS timeout values for the operator, and the requirement for SSL use to protect HTTP traffic for the operator.

The view event history operation 506 is performed by an authenticated remote operator site operations engineer or host site operations engineer, where applicable, to view events written in the current or archived event logs associated with the corresponding operator (in the case of the remote operations engineer) or all operators (in the case of the host site operations engineer).

The request OSS/BSS web method operation 508 is performed by an operator OSS/BSS system to access the Mediaroom OSS/BSS APIs via the gateway adapter 208. In one embodiment, as described in relation to FIG. 3, the gateway adapter 208 will restrict certain OSS/BSS web method calls per operator privilege levels, for example, such that only the host operator can execute OSS calls that can affect multiple operators. In one embodiment, the gateway adapter 208 will further use operator-designation subscriber groups to ensure privacy between operators (e.g., to allow the calling operator access to its own subscriber data but restrict access to other operators' subscriber data).

The request DeviceLogin web method operation 510 is performed by a Mediaroom client-facing application server 206 to access an operator ELS instance 212 via the gateway adapter 208. As described in relation to FIG. 4, the gateway adapter 208 will proxy the DeviceLogin web method requests to the appropriate operators ELS instance 212, so as to allow each operator to maintain a unique ELS instance 212. The operator ELS instance will execute their custom authentication logic and return the appropriate result to the Mediaroom platform via the gateway adapter 208.

FIGS. 1-5 and the foregoing description depict specific exemplary embodiments of the invention to teach those skilled in the art how to make and use the invention. The described embodiments are to be considered in all respects only as illustrative and not restrictive. The present invention may be embodied in other specific forms without departing from the scope of the invention which is indicated by the appended claims. All changes that come within the meaning and range of equivalency of the claims are to be embraced within their scope.

For example, the term "hosted IPTV system" as used herein is generally defined as an IPTV system having one or more resources that are shared, under control of a "master" or "hosting" operator, with one or more "hosted" operators. The shared resources include, in one embodiment, shared head-end and shared intermediate IPTV facilities.

The term "intermediate IPTV facilities" as used herein is generally defined to include server platforms and associated IPTV middleware, generally residing between head-end video acquisition equipment and subscriber access nodes, having functionality to perform IPTV services including, without limitation, receiving and processing TV content for delivery to operators (and hence, the operators' subscribers) and supporting interactions with operators via API interfaces with the IPTV middleware. In one example, the intermediate IPTV facilities include Microsoft® Mediaroom™ resources and are distributed between host-controlled facilities (containing the bulk of the resources) and operator-controlled facilities (containing a relatively small portion of resources). But alternate arrangements can be devised, for example, using intermediate IPTV facilities other than Microsoft® Mediaroom™ or distributed in a different manner or proportion between host-controlled and operator-controlled facilities.

The term "IPTV middleware" as used herein is generally defined as software or firmware that connects components or applications of the intermediate IPTV facilities with external systems or applications, including in one embodiment, application programming interfaces (API) defining interfaces and/or protocols for operator interactions (including, without limitation, OSS/BSS transactions) between operator applications or devices and intermediate IPTV resources (including, without limitation, Microsoft® Mediaroom™ resources) at the host-controlled IPTV facility.

The term "OSS/BSS transactions" as used herein is generally defined as any interaction between operator applications or devices and intermediate IPTV resources that relate to operations support systems and/or business support systems, including without limitation, transactions relating to subscriber management, billing and provisioning, client authentication, application enablement, Digital Rights Management protection, programming schedules, channel line ups, pay-per-view and VoD ordering mechanisms, and access to subscriber account information coincident to such transactions.

What is claimed is:

1. In a shared IPTV system including intermediate IPTV facilities controlled by a host operator and accessible to one or more hosted operators pursuant to a shared service arrangement, the intermediate IPTV facilities maintaining account information associated with a plurality of operators including the host operator and one or more hosted operators, a method comprising:

logically partitioning the account information associated with each of the plurality of operators into a corresponding plurality of subscriber groups; and hosting operator transactions with the intermediate IPTV facilities in a manner that allows operator access to account information of its corresponding subscriber group while restricting access to account information of other subscriber groups;

wherein the step of hosting operator transactions comprises:

receiving an operator call intended to invoke an operator transaction with the intermediate IPTV facilities, the operator call including indicia of a sourcing operator, and wherein execution of the operator call nominally provides access to account information associated with the plurality of operators;

identifying a subscriber group corresponding to the sourcing operator;
modifying the operator call to include indicia of the subscriber group of the sourcing operator, yielding an adapted call; and
forwarding the adapted call to the intermediate IPTV facilities to invoke the operator transaction as a proxy for the operator call, wherein execution of the adapted call provides the sourcing operator access to account information of its corresponding subscriber group while restricting access to account information of other subscriber groups.

2. The method of claim 1, further comprising:
identifying a privilege level of the sourcing operator;
determining if the privilege level is sufficient to execute the operator transaction; and
forwarding the adapted call to the intermediate IPTV facilities to invoke the operator transaction only if the privilege level is sufficient to execute the operator transaction.

3. In a shared IPTV system including intermediate IPTV facilities controlled by a host operator and accessible to one or more hosted operators pursuant to a shared service arrangement, the intermediate IPTV facilities maintaining account information associated with a plurality of operators including the host operator and one or more hosted operators, a method comprising:
logically partitioning the account information associated with each of the plurality of operators into a corresponding plurality of subscriber groups; and
hosting operator transactions with the intermediate IPTV facilities in a manner that allows operator access to account information of its corresponding subscriber group while restricting access to account information of other subscriber groups;
wherein the intermediate IPTV facilities include one or more application programming interfaces (APIs) defining interfaces and protocols for operator transactions with the intermediate IPTV facilities, the step of hosting operator transactions comprising:
receiving an operator call having a format consistent with the interface requirements of an API of the intermediate IPTV facilities to invoke an operator transaction, the operator call including indicia of a sourcing operator, and wherein execution of the operator call nominally provides access to account information associated with the plurality of operators;
identifying the subscriber group corresponding to the sourcing operator;
modifying the operator call to include indicia of the subscriber group of the sourcing operator, yielding an adapted call, the adapted call having a format consistent with the requirements of the API of the intermediate IPTV facilities to invoke the operator transaction; and
forwarding the adapted call to the API of the intermediate IPTV facilities to invoke the operator transaction as a proxy for the operator call, wherein execution of the adapted call provides the sourcing operator access to account information of its corresponding subscriber group while restricting access to account information of other subscriber groups.

4. The method of claim 3, further comprising:
identifying a privilege level of the sourcing operator;
determining if the privilege level is sufficient to execute the operator transaction; and
forwarding the adapted call to the API of the intermediate IPTV facilities to invoke the operator transaction only if the privilege level is sufficient to execute the operator transaction.

5. A gateway adapter for use in a shared IPTV system including intermediate IPTV facilities controlled by a host operator and accessible to one or more hosted operators pursuant to a shared service arrangement, the intermediate IPTV facilities maintaining account information associated with a plurality of operators including the host operator and one or more hosted operators, the account information logically partitioned into a corresponding plurality of subscriber groups associated with the plurality of operators, the gateway adapter comprising:
means for receiving an operator call intended to invoke an operator transaction with the intermediate IPTV facilities, the operator call including indicia of a sourcing operator, and wherein execution of the operator call nominally provides access to account information associated with the plurality of operators;
means for identifying a subscriber group corresponding to the sourcing operator;
means for modifying the operator call to include indicia of the subscriber group of the sourcing operator, yielding an adapted call; and
means for forwarding the adapted call to the intermediate IPTV facilities to invoke the operator transaction as a proxy for the operator call, wherein execution of the adapted call provides the sourcing operator access to account information of its corresponding subscriber group while restricting access to account information of other subscriber groups.

6. In a shared IPTV system including intermediate IPTV facilities controlled by a host operator and accessible to one or more hosted operators pursuant to a shared service arrangement, the intermediate IPTV facilities including one or more application programming interfaces (APIs) defining interfaces and protocols for operator transactions with the intermediate IPTV facilities, a method comprising:
intercepting at least one operator call attempting to invoke an operator transaction directed to the APIs;
adapting the call to include indicia of data uniquely available to the operator initiating the calls, yielding an adapted call, the adapted call having a format consistent with the requirements of an API to invoke the operator transaction; and
forwarding the adapted call to the API to invoke the operator transaction, wherein execution of the adapted call provides access to the data uniquely available to the operator initiating the call while restricting access to data of other operators.

7. The method of claim 6, further comprising:
logically partitioning data available to the host operator and one or more hosted operators into a corresponding plurality of subscriber groups;
the step of adapting the call comprising modifying the call to include indicia of the subscriber group associated with the operator initiating the at least one operator call; and
wherein execution of the adapted call provides access to the data associated with the subscriber group of the operator initiating the call while restricting access to data associated with the subscriber groups of other operators.

8. The method of claim 6, further comprising:
identifying a privilege level of the operator initiating the call;

determining if the privilege level is sufficient to execute the operator transaction; and forwarding the adapted call to the API to invoke the operator transaction only if the privilege level is sufficient to execute the operator transaction.

9. The method of claim 6, performed by a gateway adapter of the intermediate IPTV facility.

* * * * *